United States Patent

[11] 3,633,122

[72] Inventor Felix J. Braga
Morristown, N.J.
[21] Appl. No. 778,728
[22] Filed Nov. 25, 1968
[45] Patented Jan. 4, 1972
[73] Assignee Bell Telephone Laboratories Incorporated
Murray Hill, N.J.

[54] ACTIVE ALL-PASS NETWORK
4 Claims, 4 Drawing Figs.

[52] U.S. Cl. .......... 330/69
[51] Int. Cl. .......... H03f 1/00
[50] Field of Search .......... 330/69, 109; 328/142, 127, 151, 167, 149; 307/229, 230

[56] References Cited
UNITED STATES PATENTS

| | | | |
|---|---|---|---|
| 2,774,043 | 12/1956 | Villard, Jr. .......... | 330/109 X |
| 3,116,460 | 12/1963 | Nowlin .......... | 330/109 X |
| 2,439,245 | 4/1948 | Dunn .......... | 330/109 X |

*Primary Examiner*—Nathan Kaufman
*Attorneys*—R. J. Guenther and E. W. Adams, Jr.

ABSTRACT: A network is set forth which achieves a second-order all-pass function utilizing only one differential-type amplifier, two capacitors and four resistors. By utilizing both inputs to the operational amplifier, the desired performance may be achieved.

INVENTOR
F. J. BRAGA
BY David P. Kelley
ATTORNEY

ACTIVE ALL-PASS NETWORK

BACKGROUND OF THE INVENTION

This invention relates to an all-pass network and, in particular, to an all-pass network which may be fabricated by integrated circuitry techniques or hybrid arrangements including thin films and discrete elements.

Traditionally, all-pass networks have included frequency-sensitive elements such as capacitors and inductors. Recently, though, a new body of technology has been developed in which circuit arrangements are being designed to provide frequency shaping without the need for inductors. There are many advantages to be realized by the elimination of inductors from networks. For example, in circuit applications, inductors may create problems because of their associated magnetic fields and nonlinear behavior. In network synthesis procedures, the winding resistance, parasitic capacitance, and coil loss of the inductor element complicate the network design, while in other applications, the size and weight of inductors make them undesirable. Further, it is presently virtually impossible to realize practical inductors in integrated circuits. For these reasons and many others it is desirable to eliminate inductors from network realizations but still retain the frequency shaping capabilities provided by the inductor element.

Further, all-pass networks utilizing such passive circuit elements have introduced attenuation to a signal passing therethrough. One technique for eliminating inductor elements is to use active RC circuits. Prior art second-order all-pass networks utilizing active RC networks use two differential-type operational amplifiers and a large number of capacitors or resistors. The larger the number of differential-type operational amplifiers and passive circuit elements (including capacitors), the greater the cost and complexity of the circuit operation.

An object of the present invention is to provide a second-order all-pass network which is realized using a minimum of differential-type operational amplifiers and circuit elements, specifically capacitors.

SUMMARY OF THE INVENTION

The present invention meets the above object by utilizing a single differential-type operational amplifier having two inputs and an output. Both inputs are utilized in order to aid the realization of the second-order all-pass function. The electrical signal at the network input to be passed through the all-pass network is applied to one input through a first impedance and a second impedance is connected between that one input and ground. The output of the differential amplifier is connected to one end of a third and a fourth impedance element and the other end of the third impedance element is connected to the network input through a sixth impedance and is also connected to one end of a fifth impedance element. The other ends of the fourth and fifth impedance elements are connected together and connected to the other input of the differential amplifier.

In one arrangement, the first, second, fourth and sixth impedances are resistors and the third and fifth are capacitors. The transfer function for this network describes a second-order all-pass function. The differential-type operational amplifier and circuit elements set forth above may be fabricated by integrated circuitry techniques, thus reducing both the size and cost of the all-pass network when compared with the prior art.

In another arrangement, the first, second, third and fifth impedances are resistors and the fourth and sixth are capacitors, also producing a second-order active all-pass function utilizing merely two capacitors, four resistors and one differential-type operational amplifier.

In a third arrangement, a 180° all-pass network is developed by having the first, second, third and sixth impedances resistances, and the fourth and fifth impedances capacitors. This produces a 180° first-order all-pass function. Again, the same circuit configuration of two capacitors, four resistors and a single differential-type operational amplifier is required to produce a first-order all-pass function.

DETAILED DESCRIPTION

While the prior art all-pass networks include operational amplifiers and utilize integrated circuitry techniques, generally more than one operational amplifier is required and, in addition, more than six impedance elements including more than two capacitors are required to produce a second-order all-pass function. This number of elements and differential-type operational amplifiers is undesirable from the viewpoint of cost and complexity.

Figure 1:
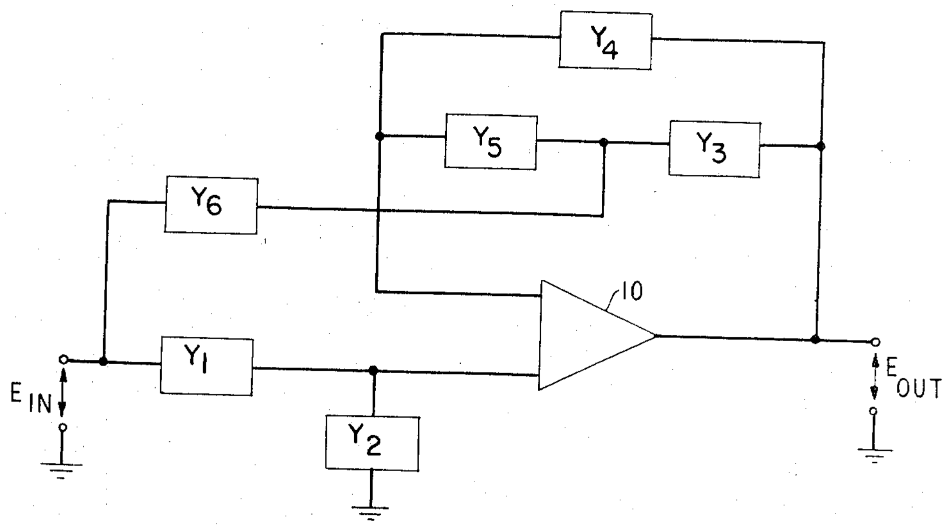
FIG. 1 is a block diagram of a generalized circuit arrangement for providing a second-order all-pass function utilizing two inputs of a differential-type operational amplifier and only six impedance elements.

A generalized arrangement of circuit elements with a single differential-type operational amplifier for providing a second-order all-pass function is shown in FIG. 1. The input signal is applied to one end of admittance $Y_1$ and to one end of admittance $Y_6$. The other end of admittance $Y_1$ is connected to one input of two-input differential-type operational amplifier 10 and is connected through admittance $Y_2$ to a point of reference potential. The other end of admittance $Y_6$ is connected to one end of admittance $Y_5$ and to one end of admittance $Y_3$. The other end of admittance $Y_5$ is connected through admittance $Y_4$ to the other end of admittance $Y_3$ and to the output of operational amplifier 10. For convenience it is shown that the amplifier has a differential input and a single ended output. However, a differential amplifier with a balanced output could be utilized with the present invention.

Utilizing network analysis techniques it may be shown that:

$$\frac{E_o}{E_{in}}=K\frac{Y_3Y_4Y+Y_5Y_3+Y_4Y_6+Y_5Y_4+Y_5Y_6\left(1-\frac{1}{K}\right)}{Y_3Y_4+Y_5Y_3+Y_4Y_6+Y_5Y_4} \qquad (1)$$

Figure 2:
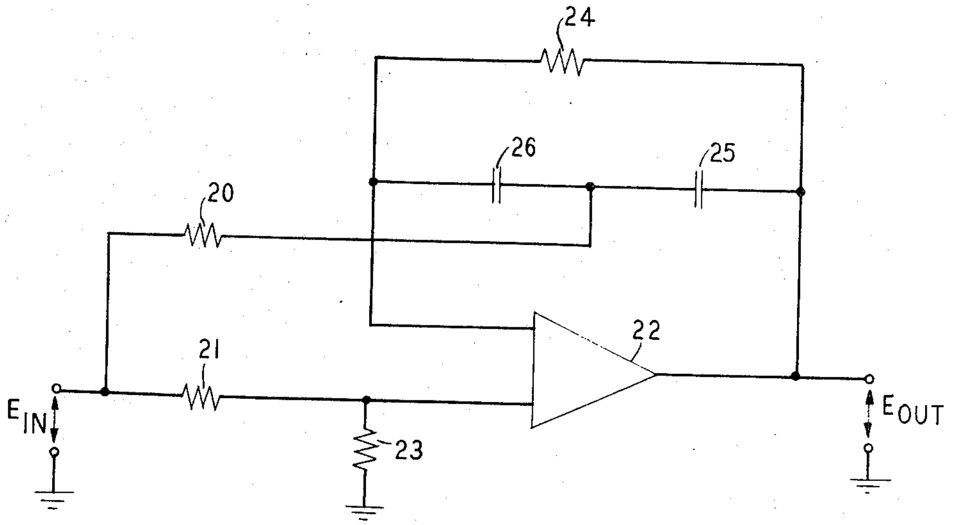
FIG. 2 is more specific schematic diagram of the generalized all-pass network shown in FIG. 1.

FIG. 2 illustrates one specific embodiment of the present invention wherein all-pass network is set forth utilizing only two capacitors and one differential-type operational amplifier. The input signal is applied to one end of resistor 20 and through resistor 21 to one input of two-input differential-type operational amplifier 22. Resistor 23 is connected between that input of operational amplifier 22 and a point of reference potential. The output of operational amplifier 22 is connected to its other input through resistor 24 and through the series connection of capacitors 25 and 26. The other end of resistor 20 is connected to the connection point between capacitors 25 and 26. By substituting the specific impedances of FIG. 2 for the generalized admittances of FIG. 1, the following equations describing the operation of the arrangement shown in FIG. 2 may be derived, assuming the gain of operational amplifier 22 is large:

$$Y_5=sC26 \qquad (2)$$

$$Y_3=sC25 \qquad (3)$$

$$Y_4,\ Y_6,\ Y_1, \text{ and } Y_2=R24,\ R20,\ R21 \text{ and } R23, \text{ respectively} \qquad (4)$$

$$\frac{E_o}{E_{in}}=K\frac{s^2-\frac{2\omega_o}{b}s+\omega_o^2}{s^2+\frac{2\omega_o}{b}s+\omega_o^2} \qquad (5)$$

where $$\frac{1}{K}=1+\frac{4}{b}\frac{\sqrt{\frac{C25}{C26}}}{\sqrt{\frac{R24}{R20}}} \quad (6)$$

$$\omega_o=\frac{1}{\sqrt{C25C26R24R20}} \quad (7)$$

$$b=\frac{\sqrt{C25C26R20R24}}{(C25+C26)R20} \quad (8)$$

$$K=\frac{R23}{R21+R23} \quad (9)$$

$$\text{Phase shift}=2\cot^{-1}\left[\frac{b}{2}\left(\frac{f_o}{f}-\frac{f}{f_o}\right)\right] \quad (10)$$

where $f$ is the frequency of the signal passing through the arrangement of FIG. 2 and $f_0=\omega_0/2\pi$ and $s$ is the Laplace transform operator.

In the prior art, a circuit arrangement to provide the transfer function shown above in equation (5) required more than one differential-type operational amplifier and more than merely two capacitors. This decrease in the number of operational amplifiers and capacitors is of benefit both in terms of its facility to be fabricated by integrated circuitry techniques and in its expense and complexity of operation. Furthermore, a large degree of flexibility in satisfying the relationships set forth in the foregoing equations may be obtained by making the various admittances adjustable.

Figure 3:
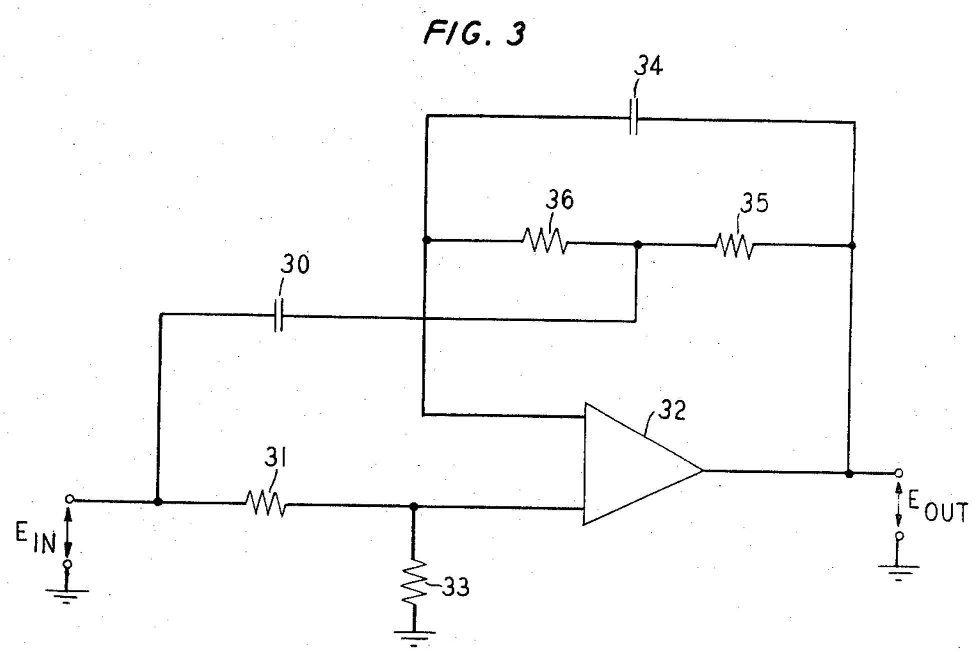
FIG. 3 is another schematic diagram of a network which provides an all-pass function utilizing a single differential-type operational amplifier.

FIG. 3 is yet another arrangement for an active all-pass filter utilizing two capacitors and a single differential-type operational amplifier. The input signal is applied to one end of capacitor 30 and through resistor 31 to one input of two-input differential-type operational amplifier 32. Resistor 33 is connected between that input of differential-type operational amplifier 32 and a point of reference potential. The output of differential-type operational amplifier 32 is connected to its input through capacitor 34 and a series connection of resistors 35 and 36. The other end of capacitor 30 is connected to the connection point between resistors 35 and 36.

The transfer function obtained with the arrangement shown in FIG. 3 is that of equation (5) but the constants set forth in equations (6) through (10) are different for the arrangement shown in FIG. 3. These constants are as follows:

$$\frac{1}{K}=1+2\frac{C34}{C30}\left(1+\frac{R36}{R35}\right) \quad (11)$$

$$\omega_0=\frac{1}{\sqrt{C34C30R36R35}} \quad (12)$$

$$b=\frac{2\sqrt{C34C30R36R35}}{(R36+R35)C34} \quad (13)$$

Again, an active all-pass filter has been set forth which utilizes only a single operational amplifier and two capacitors.

Figure 4:
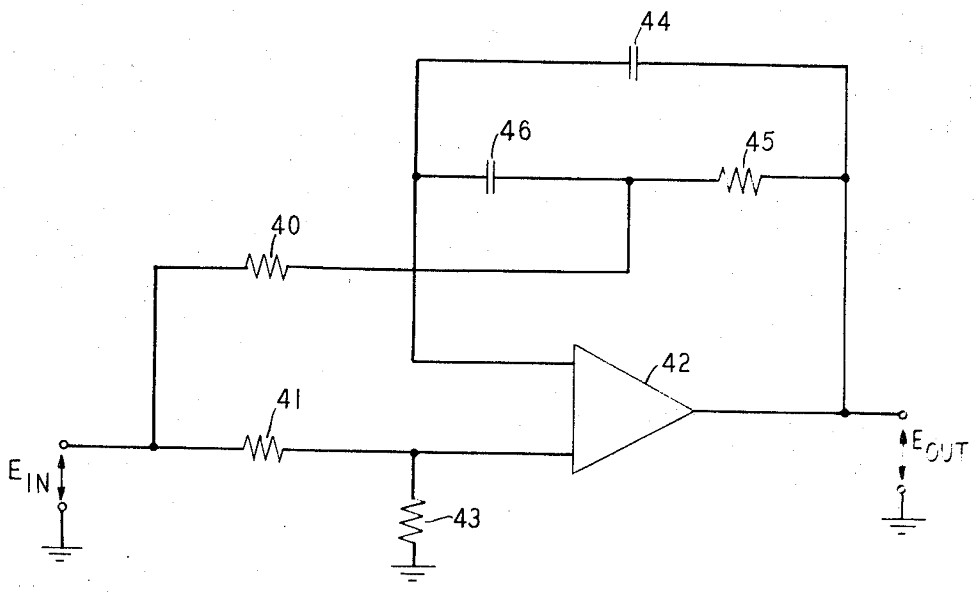
FIG. 4 is a schematic diagram for a 180° all-pass network utilizing a single differential-type operational amplifier.

FIG. 4 is a schematic diagram of a 180° all-pass network which, as with the networks shown in FIGS. 2 and 3, is a variation on the generalized all-pass network shown in FIG. 1. An input signal is applied to one end of resistor 40 and through resistor 41 to one input of two-input differential-type operational amplifier 42. That input of differential-type operational amplifier 42 is connected through resistor 43 to a point of reference potential. The output of operational amplifier 42 is connected through capacitor 44 to its other input and the output is also connected through a series connection of resistor 45 and capacitor 46 to the same other input of operational amplifier 42. The junction between capacitor 46 and resistor 45 is connected to the other side of resistor 40.

The transfer function of this network may be shown to be:

$$\frac{E_0}{E_{in}}=K_1\frac{s-\omega_0}{s+\omega_0} \quad (14)$$

where $$\omega_0=\frac{C44(R45+R40)+C46R40}{R45R40C44C46} \quad (15)$$

$$\text{therefore } \frac{1}{K_1}=1+2\left[\frac{C44}{C46}\left(\frac{R40}{R45}+1\right)+\frac{R40}{R45}\right. \quad (16)$$

$$\text{phase shift}=2\tan^{-1}\left(\frac{f}{f_0}\right) \quad (17)$$

This transfer function describes the operation of a 180° all-pass network. It has been constructed utilizing a single differential-type operational amplifier and two capacitors and may be fabricated by integrated circuitry techniques.

The three specific embodiments of the generalized all-pass network shown in FIG. 1 utilize a minimum number of capacitors and operational amplifiers to provide the second-order all-pass function required. Minimization of these elements renders the all-pass network arranged in accordance with the present invention a significant improvement over the prior art complex all-pass networks utilizing a greater number of operational amplifiers and capacitors or inductors.

I claim:

1. An electrical network comprising a differential-type operational amplifier having two inputs and supplying an output,
 an electrical signal applied to one input through a first admittance element, $Y_1$,
 a second admittance element $Y_2$ connected between said one input and a point of reference potential,
 means for applying said output to the other input of said differential-type operational amplifier through an admittance network,
 said admittance network comprising one end of a third $Y_3$ and one end of a fourth $Y_4$ admittance connected together and receiving the output of said differential-type operational amplifier, the other end of said third admittance being connected to one end of a fifth $Y_5$ admittance and connected through a sixth admittance $Y_6$ to the input side of said first admittance $Y_1$, and the other end of said fourth and fifth admittances being connected together and to the other input of said differential-type operational amplifier, said electrical network having a transfer function of the generalized form $$\frac{E_o}{E_{in}}=K\frac{Y_3Y_4Y+Y_5Y_3+Y_4Y_6+Y_5Y_4+Y_5Y_6\left(1-\frac{1}{K}\right)}{Y_3Y_4+Y_6Y_3+Y_4Y_6+Y_5Y_4} \quad (1)$$

where $E_0$ is the voltage out, $E_{in}$ is the voltage in, and $K$ is a multiplication factor, said admittances being thus related to each other and to the gain of said amplifier to produce an all-pass network characteristic.

2. An electrical network as set forth in claim 1 wherein said first, second, fourth, and sixth admittances are conductances and said third and fifth admittances are capacitive susceptances, and $$\frac{1}{K}=1+\frac{4(Y_3+Y_5)Y_6}{\sqrt{Y_3Y_5Y_6Y_4}}\frac{\sqrt{\frac{Y_3}{Y_5}}}{\sqrt{\frac{Y_4}{Y_6}}}$$

3. An electrical network as set forth in claim 1 wherein said first, second, third, and fifth admittances are conductances and said fourth and sixth admittances are capacitive susceptances, and $$\frac{1}{K}=1+2\frac{Y_4}{Y_6}\left(1+\frac{Y_5}{Y_3}\right)$$

4. An electrical network as set forth in claim 1 wherein said first, second, third and sixth admittances are conductances and said fourth and fifth admittances are capacitive susceptances, and $$\frac{1}{K}=1+2\left[\frac{Y_4}{Y_5}\left(\frac{Y_6}{Y_3}+1\right)+\frac{Y_6}{Y_3}\right]$$